July 24, 1928.
H. S. BEAL
GREASE GUN
Filed Jan. 13, 1921
1,677,997
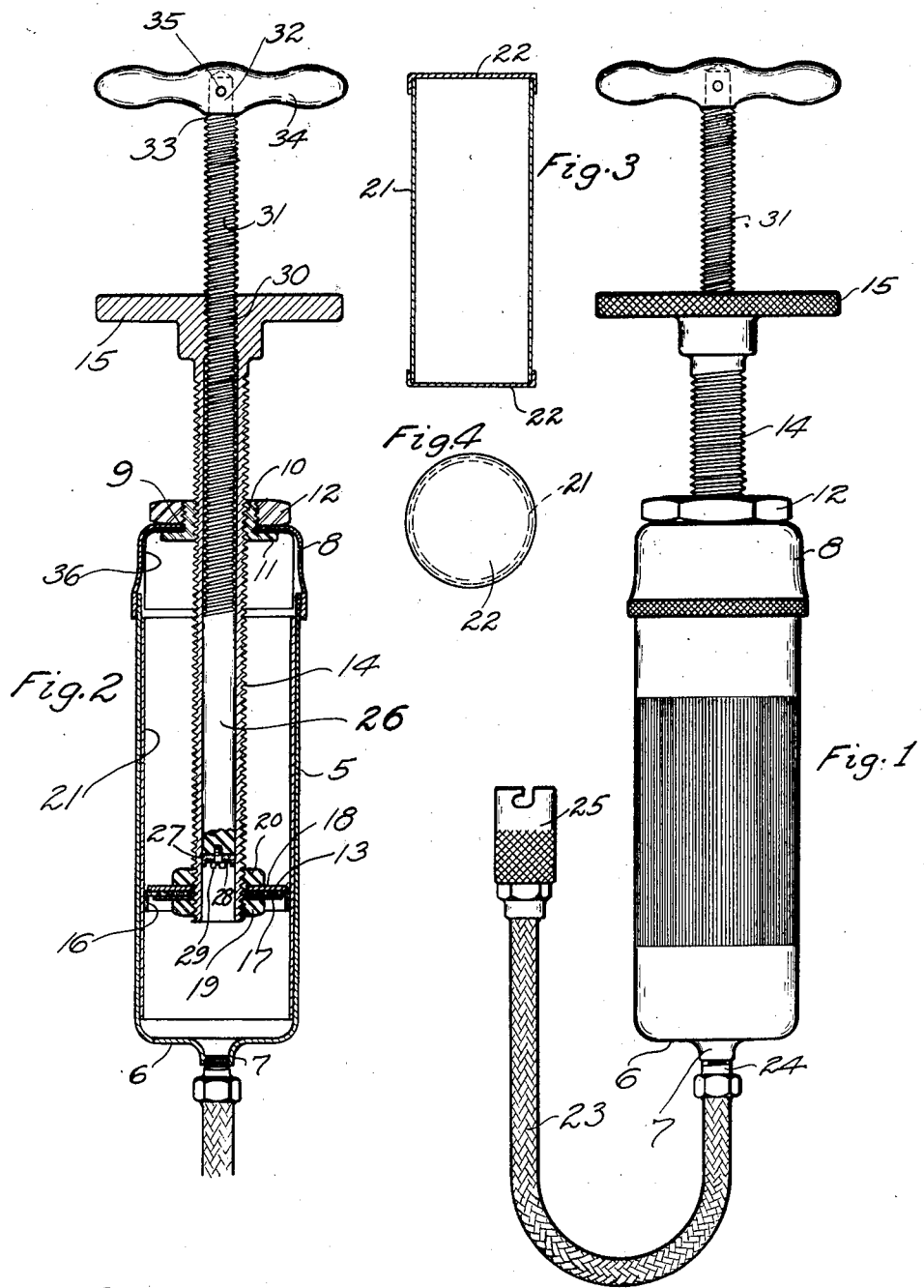
Witnesses
Carroll H. Drury
Geo. H. Perry
Inventor
Henry S. Beal Patented July 24, 1928.

1,677,997

UNITED STATES PATENT OFFICE.

HENRY S. BEAL, OF SPRINGFIELD, VERMONT.

GREASE GUN.

Application filed January 13, 1921. Serial No. 436,881.

This invention has relation to grease guns or pumps by which a semi-solid lubricating material may be introduced into a bearing or to other parts of machinery or apparatus requiring lubrication.

On the accompanying drawings:—

Figure 1 represents a grease gun or pump embodying the present invention.

Figure 2 represents a longitudinal section through the same.

Figure 3 represents an original package containing grease which may be introduced into the cylinder of the gun and through which the main piston or plunger may operate.

Figure 4 represents a plan view of said package.

The grease gun comprises a tubular casing 5 in cylindrical form having a head 6 terminating in a threaded nipple 7. With convenience this element may be died out of sheet metal if desired. At its open end the cylinder is threaded to receive a cap 8 which is apertured at 9. This cap may be threaded to receive the threaded stem of the main plunger but, inasmuch as I prefer to form it of relatively thin sheet metal, I pass through the aperture an externally and internally threaded nut 10 having an end flange 11. A second nut 12 is screwed upon the exteriorly threaded portion of the nut 11 so as to clamp the end wall of the cap tightly between it and the flange 11.

At 13 I have indicated a piston which is carried by an externally threaded piston rod 14 which is in threaded engagement with the stationary nut 10 on the cap and which is provided at its outer end with a knurled head 15 by which it may be rotated to move the piston back and forth in the cylinder or barrel 5. These parts 13, 14, and 15 constitute a screw plunger by which the grease or other lubricant may be forced out of the cylinder or barrel through the nipple 7. Any suitable form of piston may be employed, but I have shown a flexible, cup-shaped disk 16 clamped between two washers 17 and 18, which are, in turn, gripped between the two nuts 19, 20 which are screwed upon the inner end of the screw or stem 14.

The cap is of such length that the piston may be withdrawn thereinto and out of the transverse planes of the main body 5 of the cylinder of which the cap forms an extension. Then, by removing the cap, there may be introduced into the barrel or cylinder an original cylindrical package of grease. This package may consist, as illustrated in Figure 3, of a tube 21 having removable ends 22. When this tube of grease or lubricant, after its end has been removed, has been introduced into the cylinder 5, the cap 8 may then be screwed in place and the piston forced into the end of the tube which thus constitutes the lining for the cylinder. The cylinder is held against endwise movement by its engagement with the head 6, as shown in Figure 2.

If desired, there may be secured to the nipple 7 any suitable form of nozzle by which grease may be introduced into a grease cup or other aperture designed for its reception. I have illustrated the gun as being provided with a flexible conduit 23 having a threaded coupling member 24 which may be screwed into the nipple 7, and also having at its free end a coupling member 25 to cooperate with a complemental coupling member on the part to be lubricated.

As it frequently happens that the lubricant becomes hardened and caked in the grease cup or conduit therefor in the machine to be lubricated, to such an extent that it is difficult to force the grease from the barrel or cylinder thereinto by means of the large piston 13, I employ a small supplemental piston by means of which the pressure of the grease in the cylinder may be greatly increased. To this end the screw rod or stem 14 is made in tubular form open at its inner end so as to receive a supplemental plunger 26 in the bore thereof. At its lower end this plunger is provided with a cup-shaped disk 27, held in place by a washer 28 and a screw 29, for engagement with the walls of the supplemental cylinder formed by the tubular screw rod 14. The bore of the screw-rod is somewhat constricted at its upper end, namely, in the transverse plane of the head 15, and the head is internally threaded, as at 30, the upper portion of the supplemental plunger being threaded at 31 for engagement therewith. At its upper extremity the supplemental plunger is reduced, as indicated at 32, and formed with a shoulder 33, so as to receive a handle 34 which may be pinned in place by a pin 35 to permit the supplemental plunger to be rotated, and, by its threaded engagement with the head 15, to be advanced or retracted in the supplemental cylinder afforded by the hollow screw rod or stem 14.

Ordinarily under usual conditions the lubricant may be forced from the main cylinder merely by rotating the head 15 and advancing the main plunger towards the nipple 7. The rotation of the head 15 causes, of course, the simultaneous rotation therewith of the supplemental plunger. If, however, the resistance to the emission of the grease through the nipple 7 increases to a material extent the operator, while holding the head 15 stationary with one hand, may rotate the handle 34 so as to force the supplemental plunger 26 downwardly and thus forcibly eject the grease from the main cylinder. When the package of grease is first introduced into the main cylinder, the supplemental plunger may be somewhat retracted within the supplemental screw rod 14, and the grease from the package, when the main plunger is advanced into the cylinder, will be caused to enter the end of the supplemental cylinder.

One of the advantages of a grease gun such as herein described is that I may employ a main cylinder of relatively great diameter so as to receive an initially large package or tube of the lubricant, with a volume of lubricant which could not ordinarily be successfully used in a grease gun. With my arrangement, however, by alternately operating the main plunger and the supplemental plunger, it is easy to eject the grease from the main cylinder, and to force it into grease cups or the like wherein grease is caked or hardened.

It is quite immaterial whether the original package is introduced into the main cylinder, although I regard this as desirable. In any event, the cup-shaped disk 16 of the main piston is of such size that it will cooperate either with the wall of the main cylinder directly or with the wall of the tube or carton which is introduced thereinto and serves as a lining therefor. It is evident that the grease may be initially packed either in metallic or paper cartons, as may be preferred.

As previously stated, any suitable form of nozzle may be screwed into the nipple 7.

For some purposes I prefer to insert in the cap 8 a skirt 36 which is clamped between the flange 11 of the nut 10 and the end wall of the cap. This skirt is of such length that when the cap is screwed onto the cylinder 5, to constitute a continuation thereof, the skirt overlaps the screw joint.

My grease gun is especially applicable for use in connection with a flexible conduit leading from the nipple or outlet at the end of the cylinder. Since the wall of the conduit offers considerable resistance to the passage of grease therethrough, the supplemental plunger, by operating on only a small portion of the body of the grease, is, in accordance with familiar principles of physics, able to exert great pressure on the grease to force it through the conduit. The end of the supplemental plunger may be projected for a considerable distance into the cylinder and the removable tube therein, and then retracted to permit the main plunger to be forced into the cylinder and tube to compact the grease again into a solid mass. Preferably the supplemental plunger is directly alined with the outlet or nipple 7.

Having thus explained the nature of my said invention and described a way of making and using the same, although without attempting to set forth all of the forms in which it may be made or all of the modes of its use, what I claim is:

1. A grease gun comprising a main cylinder having a nipple at one end for the emission of lubricant, a main plunger movable in said cylinder, said plunger having a stem projecting from the opposite end of the cylinder and having a bore which constitutes a supplemental cylinder, and a supplemental plunger normally movable by and with the main plunger and operable in the supplemental cylinder to eject grease through said nipple when the main plunger is relatively stationary.

2. A grease gun comprising a main cylinder having an outlet at one end, a plunger having an externally threaded portion in threaded engagement with the other end of the cylinder for ejecting grease therefrom through the outlet, means for operating said plunger, and supplemental means normally movable with the main plunger but operable independently thereof to effect a greater pressure than can be exerted by said plunger upon the grease within the main cylinder for ejecting the grease.

3. A grease gun comprising a main cylinder having an outlet at one end, a main plunger operating in said cylinder and having a portion in threaded engagement with the other end of said cylinder, means for rotating said main plunger, to eject grease from the cylinder through the outlet, a supplemental plunger of smaller diameter than the main plunger normally movable therewith, and means for separately actuating the supplemental plunger when the main plunger is stationary to eject grease through said outlet.

4. A grease gun comprising a main cylinder, a main plunger operating therein and having an internally threaded bore, a supplemental plunger externally threaded to engage the internally threaded bore of the main plunger, both plungers being movable bodily in unison to force grease from said cylinder, and means on said supplemental plunger for rotating it and moving it relatively to the main plunger for ejecting grease from the cylinder under greater pressure than is exerted by the main plunger.

5. A grease gun comprising a cylinder, a main plunger consisting of a piston having a tubular stem in threaded engagement with a part of the cylinder and open at its inner end, and means on the outer end of the stem for rotating it and thereby advancing and retracting the piston, a supplemental plunger in said stem and in threaded engagement therewith, and means on said supplemental plunger, outside said cylinder, for rotating it and thereby advancing and retracting said supplemental plunger in the main plunger and cylinder.

6. A grease gun comprising a cylinder or barrel adapted to contain lubricant and having a delivery nipple, means for forcing the lubricant from said cylinder through said nipple, and a plunger carried by and normally movable by and with said means to force said lubricant through the nipple but independently movable from outside the cylinder while said means remains relatively stationary to impart greater pressure to the lubricant in said cylinder to eject it through said nipple.

7. An apparatus of the class described, comprising a holder having a chamber provided with a lubricant-delivering member, and a pair of mechanisms within said chamber for forcing lubricant into said member, said mechanisms being normally connected for simultaneous operation, one of said mechanisms being operable independently of the other while so connected to produce a materially higher pressure than the other mechanism and being carried thereby.

8. In a grease gun, the combination of a tubular shell having enclosed ends and provided with a delivery opening, a piston fitting said shell and movable longitudinally therein, a threaded plunger rod extending from said piston through one end of said shell, said plunger rod being hollow and threaded and opening into said shell between said piston and said delivery opening, a handle secured to the outer end of said plunger rod for turning the same, a second plunger rod for turning the same, a second piston fitting the bore in said plunger rod, an inner rod threaded in said plunger rod and extending from said second piston through the outer end of said plunger rod, and a second handle secured to the outer end of said inner rod for turning the same.

9. A portable lubricant pump comprising a barrel having a discharge conduit at one end, an elongated externally threaded cylinder threaded through the opposite end of said barrel, said cylinder being of smaller diameter than said barrel, means whereby said cylinder can be rotated, an annular piston carried by the inner end of said cylinder and having sealed sliding contact with the inner walls of said barrel, a rod movably mounted in said cylinder and having one end projecting outwardly beyond the outer end of said cylinder.

10. An apparatus of the class described, comprising a holder having a chamber provided with a lubricant-delivering member, and a pair of connected mechanisms within said chamber for forcing lubricant into said member, one of said mechanisms being operable independently of the other while so connected therewith for simultaneous operation to produce a materially higher pressure than the other.

11. An apparatus of the class described, comprising a holder having a chamber provided with a lubricant-delivering member, and a pair of connected mechanisms within said chamber for forcing lubricant into said member, one of said mechanisms being operable independently of the other at any position in the cylinder to produce a materially different pressure than the other.

12. An apparatus of the class described, comprising a holder having a chamber provided with a lubricant-delivering member, and a pair of mechanisms within said chamber for forcing lubricant into said member, said mechanisms being connected for simultaneous operation thereof by direct actuation of one, the other said mechanism being operable independently of the first while so connected to produce a materially different pressure than the first.

13. An apparatus of the class described, comprising a holder having a chamber provided with a lubricant-delivering member, and a pair of mechanisms within said chamber for forcing lubricant into said member, said mechanisms being connected for simultaneous operation thereof by direct actuation of one and each of said mechanisms being operable independently of the other.

14. An apparatus of the class described, comprising a holder having a chamber provided with a lubricant-delivering member, and a pair of mechanisms within said chamber for forcing lubricant into said member, said members being connected for simultaneous operation and independently operable while so connected to produce materially different maximum pressures in the lubricant.

In testimony whereof I have affixed my signature.

HENRY S. BEAL.